United States Patent Office 3,129,754
Patented Apr. 21, 1964

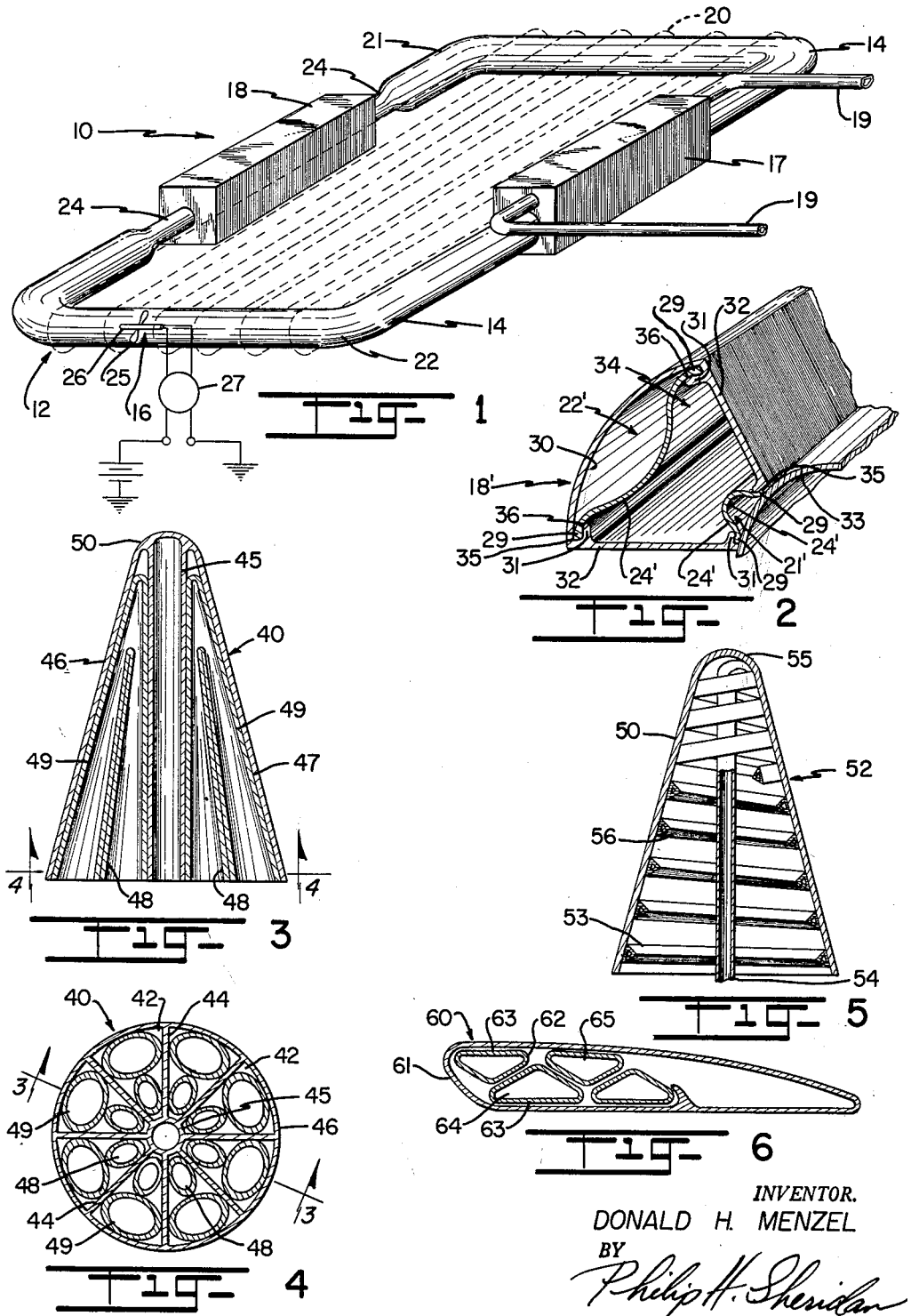

3,129,754
HEAT TRANSFER UNIT
Donald H. Menzel, 32 Hubbard Park, Cambridge, Mass.
Filed June 17, 1959, Ser. No. 820,973
2 Claims. (Cl. 165—83)

This invention relates to a novel and improved apparatus adapted to transfer heat from a high temperature region, and more particularly relates to improved means for circulation of a liquid heat transfer medium throughout a heat transfer system for the rapid and effective conduction of heat from a region subjected to the generation and concentration of intense heat within a limited area.

At this time, there is an ever increasing demand for improved methods and means of rapidly and effectively transferring the intense heat generated within a limited region. For example, the nose cone of a ballistic missile, at re-entry, experiences the intense generation of heat due to friction with the earth's atmosphere. The same is true in other objects, such as air friction at the nose of a rocket or jet plane, similar friction at the leading edge of the wings of a jet aircraft, high temperatures produced by a focused beam of solar radiation in a device employed for conversion of solar energy, or the high temperatures commonly produced inside a nuclear reactor. Under these conditions, primary consideration must be given to the high temperatures produced since the temperature range may severely limit the method and means for transporting the energy from the heat source to another medium. For instance, ordinary fluids such as water would be converted into steam at such a high pressure as to be dangerous unless contained within pipes of prohibited thickness and weight. The thickness of course tends to retard the flow of heat from the source into the heat transfer medium and the weight, especially for airborne use, would make the use of such pipes wholly impractical. Likewise, ordinary gases have similar restrictions since they too tend to build up objectionably high pressures; and in general most ordinary fluids may tend to boil, burn, char, or otherwise break down chemically.

Accordingly, it has been found desirable to employ fluids which will remain liquid over the entire working range. Many of the metals and their alloys, in liquid form, possess the requisite characteristics such as various alloys of lead, tin, zinc, etc.; however, the most effective material for this purpose has been found to be metallic gallium or, for use such as in nuclear reactors, that isotope of metallic gallium having a very low neutron cross section. Gallium is highly important, because, of all the chemical elements, it has the greatest temperature range of liquid phase so that it may be circulated without danger of its boiling or building up undesirable pressures.

In addition, to provide for the most effective conduction of heat, the pipe wall for conveying the liquid medium should be as thin as possible, with the limitation that it be capable of withstanding the pressure of the flowing fluid, and, in this connection gallium and similar fluids are most effective in that they do not tend to build up undesirable pressures and thereby permit the use of extremely thin walled pipes. At the same time, gallium like many other fluids such as water, becomes less dense in the solid state and exhibits a certain amount of expansion as it freezes, and hence will burst the thin walled pipes unless special provision is made to allow for expansion of the pipes in accordance with the degree of expansion of the fluids employed as the heat transfer medium. In accordance with the present invention, it is proposed to obviate the latter difficulty by so designing the circulating means as to provide for expansion thereof in the event of freezing of the liquid medium and to accomplish such without in any way affecting the normal flow of the liquid medium through the system. Moreover, it is made possible to design a much more compact heat transfer system and circulating means which are conformable for application to various systems to effectively carry out the rapid and efficient transfer of heat from limited areas, especially where the heat generated is of a high intensity and highly concentrated.

It is accordingly a primary object of the present invention to provide for a novel and improved apparatus capable of establishing the most effective conduction of heat from one region to another region, and which is especially adaptable for use under extremes of operating conditions, particularly in temperature range, and where the heat is highly concentrated in limited areas.

It is another object to provide for a heat transfer unit which is compact, light in weight and which enables expansion of the heat transfer medium without affecting the design and arrangement of the unit.

It is another object to produce a heat transfer unit in which provision is made for circulating means which is expansible in the event of freezing of the heat transfer medium while at the same time is capable of withstanding high pressures in the system and accomplishes the more efficient conduction of heat into the heat transfer medium.

It is a further object to provide for a novel and improved conducting means adaptable for use in a heat transfer unit which is characterized by its ability to expand in the event of expansion of a liquid medium being delivered therethrough, maintains a constant perimeter notwithstanding variations in its internal area, withstands high pressures and enables the more effective conduction of heat by the heat transfer medium.

It is a still further object to provide for a series of conducting means adaptable for use in a heat transfer unit which are compact and light in weight and moreover, which are capable of non-elastic expansion while maintaining a constant perimeter, which are conformable in a unique way for the transfer of a liquid medium through restricted areas of varied shapes for the effective conduction of heat therefrom, and which may be constructed of materials characterized by their high strength and durability so as to be capable of withstanding high pressures.

It is an additional object to provide for a novel and improved circulating system adaptable for use in a heat transfer unit wherein the circulating system is so constructed and arranged as to cooperate with the inner wall portions of the surfaces from which heat is to be absorbed whereby direct contact may be made between the heat transfer medium and the surfaces and moreover, wherein at the same time the circulating means is capable of expansion in the event of expansion of the heat transfer medium while maintaining a constant perimeter.

It is still an additional object to provide for a novel and improved heat transfer system in which a series of conducting members for a heat transfer medium may be arranged in nested relation within a limited area for the transfer of heat therefrom and wherein the conducting members are so designed as to provide for expansion of the internal areas without increase of their outer surface area and nevertheless may be made of high strength, durable materials so as to be capable of withstanding high pressures.

The above and other objects and advantages of the present invention will become more apparent from the following detailed description taken together with the accompanying drawings, in which:

FIGURE 1 is a schematic view of a heat transfer unit, in accordance with the present invention.

FIGURE 2 is a fragmentary, detailed section view of a modified form of circulating means, in accordance with the present invention.

FIGURE 3 is a perspective, detailed view illustrating the disposition and arrangement of circulating means in the nose of a rocket or jet aircraft.

FIGURE 4 is a cross sectional view of the nose portion shown in FIGURE 3.

FIGURE 5 is a modified form of construction and arrangement of a series of circulating means; and FIGURE 6 is a sectional view of the disposition and arrangement of a series of delivery lines constructed in accordance with the present invention illustrating the manner in which they may be disposed in an airplane wing portion.

With more particular reference to the drawings, there is shown by way of illustrative example in FIGURE 1 a schematic view of a heat transfer unit 10 designed in accordance with the present invention. Broadly, the heat transfer unit 10 constitutes conveying or circulating means 12 preferably in the form of thin walled pipe members having disposed in an enlarged section 14 thereof pump means 16 to drive a heat transfer medium, such as a liquid metal or metal alloy, for circulation between a heat exchanger or suitable working medium 17 and a heat source 18. In the preferred form, the heat transfer unit 10 is of the surface type wherein the heat is transferred from the heat source through the metal walls of the circulating means to the heat transfer medium and, in order to avoid building up undue pressure in the system and to avoid contamination of the heat transfer medium the unit also forms a closed or sealed system.

The heat source 18 is representative of various heat radiating regions or sources, such as a boiler, or furnace box of a nuclear reactor, or the leading edge of the wing of an aircraft, and of course unlimited similar types of heat generating surfaces or areas. However, the present invention is directed essentially to the conduction of heat away from high intensity heat sources where high temperatures, broad ranges of temperature and high concentrations of heat must be taken into consideration. In addition, the heat exchanger 17 is merely representative of a medium whereby the heat absorbed by the heat transfer medium in flowing through the heat source 18 is given up to the heat exchanger or working medium 17; thus, the heat energy absorbed by the heat transfer medium may be converted into energy to perform useful work or may simply be given up to a suitable heat conducting material within an exchanger which is then conducted away by means of a suitable coolant transported, in contraflow to the flow of the heat transfer medium, through pipe line 19.

Since the entire system may at intervals be allowed to cool to temperatures below the melting point of the heat transfer medium, it is desirable to employ some artificial means for melting the medium in the event it becomes frozen or solidified. In accordance with conventional practice, this may consist of some artificial source of heat such as hot air jets, and as illustrated in FIGURE 1 consists of an electric heating coil 20 which may or may not form a permanent part of the system, and the heating coil may be spirally wrapped about a portion of the conveying means 12 preferably just ahead of the pump means 16 so as to liquify the medium for circulation by the pump. In this connection, dependent upon the type of liquid heat transfer medium employed, freezing of the liquid will generally involve a change of density thereof. If this change in density causes an increase in volume, and hence expands as it freezes, the increase in internal pressure of the heat transfer medium will tend to cause bursting of the unit unless provision is made to allow for this expansion. As mentioned, many liquid metals and many of their alloys, such as gallium, exhibit this characteristic, and, although otherwise ideally suited for use as a heat transfer medium in a closed system of this type throughout the normal working temperature range, provision must be made for their expansion in the event of freezing.

From the above, a primary feature of the present invention is in the design of the circulating means 12 in such a way that it is capable of expanding when the heat transfer medium undergoes expansion upon freezing, is capable of carrying a high pressure fluid therethrough while providing for rapid heat conduction in the area of the heat source and moreover, exhibits the ability to expand without increasing its exterior surface area. The latter is especially important where it is necessary to rapidly conduct heat away from a high intensity, highly concentrated restricted heat area as is so often encountered in air borne systems, such as missiles, rockets and similar aircraft. The above is most desirably accomplished in accordance with the present invention by forming the circulating means 12 of tubular members of resilient metallic materials having a non-circular cross section. The tubular members are made non-circular and dimensioned such that under the action of internal pressures the cross sectional area of the tubular members will increase to change the shape of the metallic tubes to a substantially circular cross section. A non-circular cross section is employed because, of all geometrical figures, a circle of course contains the maximum area for a given perimeter. Thus, by forming the tubular members into an elliptical shape, for example, the cross sectional area will be substantially less than the cross sectional area of a circle of the same circumferential dimension. Accordingly, the elliptical tubes are capable of expanding from their initial cross section toward a cross section of circular shape with a corresponding increase in cross sectional area in the interior of the tubes. In practice, this result is preferably accomplished by employing tubes composed of material such as spring steel, which alters its cross section by actual change of shape rather than by elastic expansion. In this manner, expansion of the tubes forming the conveying means will take place, without requiring an actual change in exterior surface area or perimeter, through a change in the internal area of the tubular members. When the heat transfer medium then undergoes expansion within the conveying means, the elliptical tubes defining the conveying means are dimensioned to undergo a corresponding expansion into a shape of generally circular dimension without danger of bursting and without increase in exterior area. Moreover, when employing a material such as spring steel, when the pressure is released through melting of the heat transfer medium, the resilient tubes will automatically spring back to their initial shape.

In the preferred form and as best seen in FIGURE 1, the non-circular tubular members forming the conveying means 12 define a generally enlarged tubular section forming return line 21 from the heat source 18 to the intake side of the heat exchanger together with delivery line 22 extending from the outlet side of the heat exchanger. The tubular section is enlarged for movement through the heat exchanger so as to provide a relatively large cross section with a correspondingly low rate of flow of the heat transfer medium through the heat exchanger. Leading through the heat source 18 however the conveying means is considerably reduced in cross sectional area as at 24 to correspondingly increase the velocity of flow of the heat transfer medium therethrough and attain most effective heat transfer in the heat source. Of course the reduced cross section of the conveying means as at 24 may be defined by a plurality of branch pipes leading from the section 22 and into the return line 21 away from the heat source, so that a number of radiating surfaces are provided in the heat source for a most effective conduction of heat therefrom. In this connection, it is also preferred to form the tubing throughout the section 24 with as large a radiating surface as possible and this may be done by deforming the tubular section, or sections, into an ellipse of very high eccentricity to thereby form broad, substantially flat surfaces. This manner of construction also serves to greatly reduce the internal cross sectional area for a high rate of flow of the heat transfer medium therethrough under normal operations and to permit substantial deformation of the tube with a high increase of its internal area in the event of freezing and resultant expansion of the heat transfer medium when the system is not in operation. In addition, where the heat loss is to be by radiation, the exterior surface of the tubular section 24 should be black in the spectral region of the dominant radiation so as to provide for maximum heat absorption and corresponding radiation from the heat source 18 to the heat transfer medium.

In order to circulate the heat transfer medium through the unit, pumping means 16 is interposed at the desired location in the unit and it will be evident that various pumping means may be utilized to this end. However, it is preferred to employ a conventional, motor driven screw propeller 25 mounted on a shaft 26 with the shaft being geared for rotation to motor 27 positioned exteriorly of the conveying means 12. As noted, the screw or propeller 25 is preferably positioned within the delivery section 22 and, due to the eccentricity of the tubular means forming the section 22, the propeller 25 is tilted about the axis of rotation until the effective cross section thereof is slightly less than that of the tube, and the fact that the vector flow in the vicinity of the pumping means is not precisely parallel to the walls of the tubes has been found to lead to no adverse effect. Of course other types of pumps may be employed if desired, such as a rotary or vane type pump to impel or direct the liquid medium through the transfer unit; also a number of pumps may be employed, such as one stationed in the delivery section 22 and one in the return section 21, if desired, for accomplishing the most uniform rate of flow therethrough.

In the modified form of the present invention shown in FIGURE 2, there is illustrated a variation in the construction and arrangement of a tubular section 24' to establish direct contact between the heat transfer medium and inner wall of the heat source 18' and enable expansion of the internal area in the event of expansion of the heat transfer medium. To this end, the circulating means is defined by the tubular section 24' which is made up of a semi-tube formed of a longitudinal, relatively flat, convex curved portion having enlarged rims or beads 29 along each side, and inner wall portion 30 of heat source 18' which is adapted to engage the rims 29 and enclose the portion to form the tubular section. The heat source 18' itself may form a portion of a nose cone of a missile and the like and permits direct contact of the heat transfer medium with the heat source so as to provide for most effective conduction of heat therebetween. An important feature of this form of the invention is in the manner of disposition of the rims or beads 29 along the edges of the tubular section 24' into connected but adjustable relation with a pair of flanges 31 forming projections from radial partitions 32 of the heat source. As shown, the wall 30 may be generally arcuate in shape with the radial partitions 32 extending inwardly therefrom for connection to an inner, concentric, cylindrical tube 33 and divide the nose cone into a series of sectors 34. In each sector, the projections 31 extend toward one another and are inclined slightly toward the wall 30 to form restricted openings 35 for disposition of the beads. In addition, it is desirable to provide slight outward curvatures or protuberances 36 at the distal ends of the flanges 31 which serve to limit the inward slidable movement of the rim 29. Also, the rims 29 are slightly enlarged and are curved outwardly from the body of the tubular sections for disposition in press-fit sealed relation within the restricted openings 35. Under expansion, the semi-tube is capable of first moving outwardly under deformation to take a generally circular shape. If further expansion is required, the rims 29 may then move or slide inwardly along the outer surface of the flanges and this movement will be limited only by engagement of the enlarged extremities of the rims with the protuberances 36. Again, the tubular sections 24' are preferably composed of a resilient metal, such as spring steel such that upon release or reduction in pressure of the heat transfer medium, the tubular section will spring back to original form.

As will be further noted from FIGURE 2, more than one tubular section 24' may be disposed within a sector 34. For example, flanges 31 are also shown positioned adjacent to the outer surface of the tube 33 and a tubular section 24' is positioned with rims 29 inserted between the flanges and center wall portion 33. When a plurality of tubular sections are employed, and particularly in a limited space, it will be evident that there will be some increase in the area of the sections as they are expanded by the heat transfer medium, and accordingly some spacing must exist between the opposed tubular sections so as not to interfere with this expansion. Where employed in the nose cone of a rocket, the outermost tubular section, for example, can be employed as a delivery line 22' and the innermost section employed as a return line 21' to conduct the heat transfer medium therethrough in direct contact with the surfaces of the nose cone. Here, of course, the tubular sections are led rearwardly from the nose cone into enlarged tubular sections, preferably, for flow through a suitable heat exchanger as described with reference to FIGURE 1.

Referring to FIGURES 3–6, inclusive, there are illustrated varied, unique designs and arrangements of the circulating means located for travel along the surfaces of various typical heat sources. In FIGURES 3 and 4 there is shown a nose cone 40 which may be that of a rocket, missile or jet aircraft and is divided into a series of sectors 42 by means of radial surfaces 44 extending from central cylindrical portion 45 to the exterior cylindrical wall portion 46. As mentioned, air friction at the nose of a rocket or jet aircraft, for example, has a tendency to develop very intense heat which is highly concentrated in the restricted area of the nose cone. Accordingly, to establish the effective and rapid conduction of heat away from the nose cone, it is highly desirable to enable the compact arrangement of a series of conducting tubes throughout the sectors 42 for the transfer of heat therefrom. To this end, the circulating means constructed in accordance with the present invention are especially adaptable in that the non-circular cross sections of the conveying means may be adapted in configuration to conform to the generally triangular shape of the sectors. Accordingly, in each sector 42 there is extended lengthwise therethrough a tubular section 47 which is doubled upon itself to form delivery line 48 and return line 49 so that the heat transfer medium is pumped along the central portion 45 for return along the wall portion 46. To conform to the generally triangular configuration of the sectors 42, the delivery side 48 is elliptical shaped with its longitudinal axis lying substantially on a radius extending from the center of the nose cone, whereas the return side 49 has its longitudinal axis disposed perpendicular to the longitudinal axis of the delivery side. By this arrangement, in the event of expansion of the heat transfer medium the return side 49 will expand radially essentially along its minor axis to move against the adjacent surface of the delivery side 48; however, the delivery side will be caused to expand along its minor axis so as to reduce the length of its longitudinal axis to permit expansion of the delivery side in that direction. Due to the tapering of the nose 42, each of the tubular sections must necessarily be tapered or converge toward the tip 50 of the nose and therefore become smaller in cross sectional area as the sections approach the tip end. This will cause a corresponding increase in the velocity of flow through the tubular sections and thereby establish greater heat transfer as the tubular sections approach the tip end where of course the heat generated by air friction will be greatest.

In the modified form of FIGURE 5 there is shown a nose cone 52 having a hollow interior and to accomplish the transfer of heat from the tapered wall portion forming the nose cone, a tubular section 53 is positioned therein for conducting the heat transfer medium therethrough by means of an elliptical input line 54 extending centrally through the nose cone toward tip end 55, and at the tip end the input line 54 is curved to extend into a spirally formed outlet line 56. Again, the pipe forming outlet line 56 is non-circular, but instead of the preferred elliptical shape is given a triangular shape such that one side of the pipe 56 forming the triangle provides a greater contact area with the inner surface of the nose to enable the effective absorption of heat therefrom for transfer to the liquid medium. Correspondingly, in the event of freezing of the liquid medium the triangular cross-sectional area has the ability to expand toward the shape of a pipe of circular cross section and again will obviate the danger of bursting due to the increased pressure of the gallium.

In FIGURE 6 there is shown an airplane wing portion 60 having a leading edge 61 in which a series of tubular sections 62 are arranged in nested relation for extension along the inner surface of the airplane wing adjacent the leading edge thereof for cooling purposes. Again, the tubular sections are triangular in cross section and of a generally flattened configuration wherein the longer side portions 63 are positioned for extension in contact with the inner surfaces of the wing. Lower sections 64 which extend adjacent the bottom surface of the wing serve as input lines with upper tubular sections 65 serving as outlet lines for the respective delivery and return of the heat transfer medium. Upon expansion of the liquid medium, the internal cross sectional area of the tubular sections will increase while maintaining a constant perimeter and the sections will increase under deformation again to take the form of a generally circular cross section without in any way interfering with the expansion of adjacent tubular sections. As a result, the greatest number of sections possible may be extended along the surface area of the wing portion with one side of the triangular cross section of the tubular sections being in contact with the surface area throughout the length thereof for the most direct and effective transfer of heat, especially along the leading edge. Since the thin-walled pipes forming the tubular sections do not undergo elastic expansion, it is again possible to form the pipes of high strength materials and as mentioned with reference to the various other forms, this is preferably a resilient metallic material such as spring steel, which is able to assume its original shape once the heat transfer medium becomes melted and the pressure reduced in the lines.

It will be apparent that the above described modifications of the present invention are merely given as illustrative to show the conformability of the design and construction of the conveying means of the heat transfer unit to various applications. Thus, for any application requiring the rapid and efficient transfer of heat, especially from a limited area, the conveying means together with the heat transfer medium employed provide a high degree of utility and efficiency in carrying out the heat transfer operation. Obviously the conveying means may be formed or deformed in any number of ways for adaptation to the particular type of heat source. In this connection either a number of independent units with separate pumping elements may be employed, or a single pump may be employed for supplying a number of parallel branches leading through the heat source.

It is therefore to be understood that various changes and modifications may be made in the construction and arrangement of the present invention without departing from the scope thereof as defined by the appended claims.

What is claimed is:

1. In a heat transfer system of the surface type adapted to transfer heat through a liquid heat transfer medium from a heat source providing a radiating surface, a tubular section for conducting the liquid medium in direct contact with a curved radiating surface, said tubular section constituting a relatively flat, curved portion of resilient material including flat rim portions extending outwardly along each side thereof and spaced projections on the inside of said radiating surface being disposed for sealed engagement with said rims in such a way that said rims are free to slide in relation to the projections while maintaining sealed engagement therewith to provide for expansion of said curved portion to an increased internal area in the event of expansion of the liquid medium.

2. In a heat transfer system adapted for the cooling of heat radiating surfaces wherein there is employed a liquid medium for absorbing heat from the surfaces with the medium being characterized by remaining in liquid form over an extended working range and by being subject to expansion in the event of freezing, a series of longitudinal, relatively flat, convex curved portions of resilient material including outwardly extending rim portions along each side of said curved portions being slidably connected to the inside of the heat radiating surfaces thereby to establish direct contact of the liquid medium with the surfaces and to provide for expansion of said portions to an increased internal area in the event of freezing of the liquid medium.

References Cited in the file of this patent

UNITED STATES PATENTS

| | | |
|---|---|---|
| 660,292 | Durr | Oct. 23, 1900 |
| 1,059,370 | Johnson | Apr. 22, 1913 |
| 1,082,594 | Kern | Dec. 30, 1913 |
| 1,374,021 | McNeely | Apr. 5, 1921 |
| 2,371,269 | Seaman | Mar. 13, 1945 |
| 2,723,092 | Paselk et al. | Nov. 8, 1955 |
| 2,873,933 | Fanti | Feb. 17, 1959 |

FOREIGN PATENTS

| | | |
|---|---|---|
| 839,792 | France | Apr. 12, 1939 |
| 589,409 | Great Britain | June 19, 1947 |

OTHER REFERENCES

Principles of Nuclear Reactor Engineering, published July 1955 by De Van Nostrand Company, Inc., page 524, lines 5–12.